(12) United States Patent
Reents et al.

(10) Patent No.: US 11,093,308 B2
(45) Date of Patent: Aug. 17, 2021

(54) SYSTEM AND METHOD FOR SENDING MESSAGES TO CONFIGURE REMOTE VIRTUAL ENDPOINTS IN NODES OF A SYSTOLIC ARRAY

(71) Applicant: OVH US LLC, Newark, DE (US)

(72) Inventors: Daniel B. Reents, Dripping Springs, TX (US); Ashwin Kamath, Cedar Park, TX (US); Michael Enz, Fargo, ND (US)

(73) Assignee: OVH US LLC, Newark, DE (US)

( * ) Notice: Subject to any disclaimer, the term of this patent is extended or adjusted under 35 U.S.C. 154(b) by 186 days.

(21) Appl. No.: 15/844,487

(22) Filed: Dec. 15, 2017

(65) Prior Publication Data

US 2019/0188182 A1    Jun. 20, 2019

(51) Int. Cl.
*G06F 9/54* (2006.01)
*G06F 15/80* (2006.01)

(52) U.S. Cl.
CPC .......... *G06F 9/546* (2013.01); *G06F 15/8046* (2013.01); *G06F 2209/544* (2013.01); *G06F 2209/548* (2013.01); *G06F 2209/549* (2013.01)

(58) Field of Classification Search
CPC ...... G06F 9/546; G06F 13/00; G06F 15/8046; G06F 2209/549; G06F 2209/544; G06F 2209/548
See application file for complete search history.

(56) References Cited

U.S. PATENT DOCUMENTS

| 5,404,550 A * | 4/1995 | Horst | G06F 9/4494 712/14 |
| 5,826,049 A * | 10/1998 | Ogata | G06F 15/17368 710/317 |
| 6,393,026 B1 * | 5/2002 | Irwin | H04L 45/00 370/394 |
| 8,423,749 B2 * | 4/2013 | Mejdrich | H04L 45/58 712/30 |
| 2005/0238022 A1 * | 10/2005 | Panigrahy | H04L 63/0254 370/392 |
| 2009/0282419 A1 * | 11/2009 | Mejdrich | H04L 47/10 719/314 |

* cited by examiner

*Primary Examiner* — David J. Huisman
(74) *Attorney, Agent, or Firm* — BCF LLP

(57) ABSTRACT

Embodiments as disclosed herein provide for methods and systems that give firmware in a given node the ability to control the hardware configuration and activity of every endpoint in every remote node within the array. The standard, inter-node, message passing interconnect and protocol are utilized for this purpose.

20 Claims, 1 Drawing Sheet

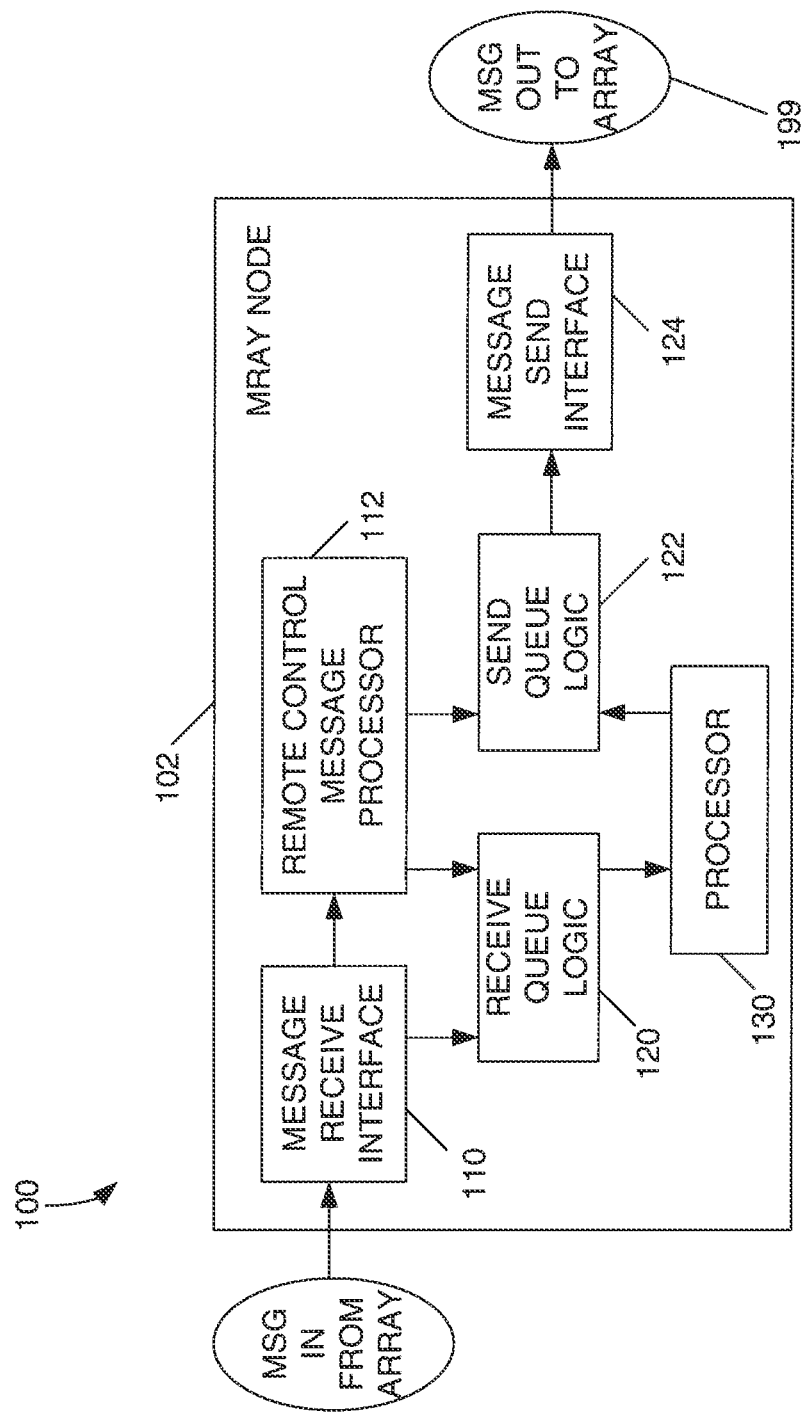

US 11,093,308 B2

SYSTEM AND METHOD FOR SENDING MESSAGES TO CONFIGURE REMOTE VIRTUAL ENDPOINTS IN NODES OF A SYSTOLIC ARRAY

TECHNICAL FIELD

The subject disclosure relates generally to computer software and hardware design. In particular, the subject disclosure relates to remote virtual endpoint in a systolic array.

BACKGROUND

Typically the endpoints, virtual or otherwise, present in each node within a systolic array, are configured at system boot time by a central management entity. The management entity has some "fixed" pre-knowledge of the configuration requirements based on how the firmware in each individual array node interacts with each other. It is also typical that a given node's firmware does not have the ability to directly re-configure or control the endpoint hardware and activity of a remote node's endpoints.

SUMMARY OF THE SUBJECT DISCLOSURE

The present subject disclosure presents an exemplary hardware and software mechanism by which a virtual endpoint (i.e., send queue) located in a node and controlled by that node's local firmware can fully control the virtual endpoint hardware (i.e., send queue or receive queue) located in a remote node utilizing standard array messaging hardware and protocol.

In one exemplary embodiment, the present subject matter is a method for performing endpoint control in a systolic array. The method includes generating a remote control message in a first node, wherein the message comprises a descriptor that includes an identity of a second node and instructions specific to the second node; and sending the remote control message to the second node; receiving at the second node the remote control message; and performing the instructions at the second node.

In another exemplary embodiment, the present subject matter is a method for performing endpoint control in a systolic array. The method includes generating a remote control message in a first node, wherein the message comprises a descriptor that includes an identity of a second node and instructions specific to the second node; and sending the remote control message to the second node; receiving at the second node the remote control message; parsing the remote control message; and performing the instructions at the second node without the use of a local processor connected to the second node.

In yet another exemplary embodiment, the present subject matter is a system for performing endpoint control in a systolic array. The system includes a first node having a send queue logic and adapted to generate a remote control message having a descriptor that identifies a second node and defines an operation to be conducted at the second node without the use of a local processor; and a second node having a remote control message processor that receives and parses the remote control message.

BRIEF DESCRIPTION OF THE DRAWINGS

Various exemplary embodiments of this disclosure will be described in detail, wherein like reference numerals refer to identical or similar components or steps, with reference to the following figures, wherein:

FIG. 1 illustrates a system diagram of remote virtual endpoint control in a given node in a systolic array, according to an exemplary embodiment of the present subject disclosure.

DETAILED DESCRIPTION

According to the present subject disclosure, this present subject disclosure gives every firmware instance in every node the ability to control the hardware configuration and activity of every endpoint in every remote node within the array. The standard, inter-node, message passing interconnect and protocol are utilized for this purpose.

Because a remote node endpoint's hardware can be fully controlled by this "local" node's firmware, the local firmware can orchestrate data/control message passing between itself and the remote node (in either direction) or between any two (or more) nodes within the entire array. This mechanism can be used for configuration, functional operations, and/or as a very powerful diagnostic tool for the array.

There are many novel aspects of the mechanism discussed according to the present subject disclosure. For example, the present mechanism utilizes the standard node interconnect bus and protocol, and does not require any additional interconnect. Further, the "local" node's firmware has complete access to both the remote endpoint's send and receive resources. It can cause the remote node to send messages or set it up to receive messages. As such, the local firmware can retrieve the entire queue buffer memory contents of a remote node, or direct those contents to some other remote node of its choice. Further, if the endpoint configuration space increases in size (i.e., the number of configuration registers increases) as the design develops, the mechanism can be easily adapted by simply modifying the remote access processor hardware block. Other advantages are also evident to one having ordinary skill in the art after having considered the present disclosure.

The present subject disclosure may also be considered as a technique for Remote Memory Access (RMA). Such reference may be used synonymously. In addition, specific components of the hardware design (i.e., Verilog RTL modules, register bit names, signal names) may utilize the "RMA" nomenclature and appear in the text below.

In use, a Remote Control (RC) message is constructed to provide the necessary instructions to the target node. RC messages may have the following requirements when being constructed by the sending queue: (1) The message indicates a unique hardware virtual endpoint address within the systolic array that receives RC messages. (2) The RC message defines the remote send or receive queue that will be programmed. For example, this may be the register offset for the queue specific configuration registers. (3) The RC message contains configuration values for the remote resource's registers. This configuration list may be encoded in multiple formats. For example, it may be a bitmask indicating which registers to program, followed by a list of register values, where each register is programmed in order. Alternatively, it may be a list of register offset and register value pairs, allowing an arbitrary programming order.

In this implementation, the remote node receives RC messages in a hardware queue with dedicated buffering that is separate from processor receive queues. The reception of an RC message is a "side-band" function internally to the node and does not touch receive queue memory on the receiving node. Remote firmware is not required to be operational to receive and process RC messages, allowing this mechanism to operate for initial processor configuration.

The present mechanism is useful as a generic mechanism for a node to configure any queue configuration on a remote node without the use of the remote node's processor. As such the configuration of a node is intended to behave exactly the same whether being configured locally or remotely. As such, any specific configuration sequencing requirement that is required by the local processor to perform a specific function is also required by the remote processor. This implies that multiple RC messages may have to be sent to a remote node in order for it to perform a given function.

Further, as discussed herein, this mechanism may be used for the purpose of allowing one node to read or write a remote node's memory, termed a Remote Memory Access (RMA). For example, the below steps present a very general remote read sequence (i.e., a local node wants to read some queue memory on a remote node):

1) The local node's processor configures one of its send queues to issue RC messages to a specific remote virtual endpoint.
2) The local node's processor configures one of its receive queues to receive read data from the remote node.
3) The local node's processor forms an RC message in the contents of its aforementioned send queue. The local node defines the remote send queue to configure by writing that address within the RC message. It adds the appropriate register writes to the RC message to configure the remote send queue's base address, queue size, entry size, and message header at a minimum. The remote send queue's message header will be configured such that the message that the remote node sends will be routed back to the local node's receive queue configured in step 2.
4) When the local node's processor would like to have the remote data sent to it from the remote node, it will form and send an RC message that initiates sending of a message from the remote node to the local node.

The RC related hardware is a virtual endpoint in the systolic array that receives RC messages. It buffers messages in a small local FIFO and processes the messages sequentially.

The RC hardware does not require the local processor to be actively running. This allows a single node to configure the queues for all other nodes in the systolic array.

While RC hardware is configuring a queue, all normal operations to/from the queue will be blocked until the RC message processing is complete. This provides a minimal level of synchronization between normal queue operations and RC message processing to avoid errors on a partially reconfigured queue. There is no serialization between RC message processing and local node configuration, as firmware may easily manage that requirement.

An exemplary embodiment of a system 100 according to the present technique, as implanted in a lattice array (MRAY) node 102, is shown in FIG. 1. This is the standard node component of the array. Two or many of such nodes 102 may be interwoven into a lattice configuration. Such a lattice is not shown here for sake of simplicity, but is comprised of a plurality of such nodes 102, including one "local" node and one "remote" node, for sake of explanation of the present subject disclosure. These nodes 102 are interconnected and communicate via a message bus. Each message is produced by a node's send queue logic 122 and has a routing header which describes how the message is to be routed through the interconnect. The routing header determines the destination virtual endpoint, which is both a node and receive queue within that node that is to consume the message. Both the send queues and receive queues are referred to as endpoints. They are referred to as being virtual because they can be dynamically configured in the hardware from a contiguous pool of memory. An RC message is addressed to a unique virtual endpoint address for the RC hardware for a particular endpoint.

In the given system 100, there exists a message receive interface 110, which is responsible for: (a) sending the message to the message send interface 124 if the message is not targeting this node (arrow not shown), or; (b) sending the message to the targeted receive queue logic 120 within the node, or; (c) sending the message to the remote control message processor 112. Where such message is sent depends on the instructions incorporated into the message.

The receive queue logic 120 is responsible for placing the incoming message from the message receive interface 110 into the proper location within the queue memory and generating the appropriate status that allows the processor to become aware of the presence of the message.

The remote control message processor 112 is presented with any incoming RC messages that are destined for this node 102. Once received, the message is parsed and depending on the contents of the message's RC header field, either the receive queue logic 120 or the send queue logic 122 configuration registers are written with the contents of the message.

The send queue logic 122 is responsible for taking stimulus from the processor 130 or the remote control message processor 112 and generating messages to the message send interface 124. The data contents of the message come from the queue memory.

A processor 130 or CPU executes out of its local instruction memory and is responsible for processing any incoming messages that are populated in the receive queue logic 120 memory. The processor 130 is also responsible for populating send queue logic 122 memory and generating output messages formed from the data contents placed in the send queue memory.

A message send interface 124 is responsible for sending output messages out into the array 199 or into the interconnect mesh. Messages can be sourced from: (a) the message receive interface 110 (arrow not shown); or (b) send queue logic 122.

In operation, the present system and technique allow for one local node 102 to control the operation of another "remote" node without the need for the use of the remote node's processor. This allows for a more efficient, more robust, and less error-prone operation of activities in a series of nodes. For example, one node can be used to statically configure all other nodes without the need to reboot. Many other advantages and applications of the present technique are also possible and within the purview of one having ordinary skill in the art.

The subject matter described herein may be used in a variety of preferred ways, including, for example, generation of a module level description of the mechanism; low level, micro-architecture document showing block level flow diagrams for the implementation; generation of Verilog RTL to implement the design; block level simulation to verify the design and modify any issues found; integration into the top level design; system level simulation; standard back-end ASIC development process to produce the targeted device. Other variations are also possible.

Alternate uses of the subject disclosure are also within the scope of the present disclosure. For example, the implementation is conceived in such a way as to adapt to endpoints that may require additional queue resources. It is believed that various specific use cases for this mechanism will be evident and applied to standard products and will be developed utilizing this array.

The examples and methods described above are not limited to software or hardware, but may be either or a combination of both. If software, the method described is presented as code in a software program. If hardware, a processor is used to conduct the steps which are embedded within the hardware. The subject matter may also be a combination of software and hardware with one or more steps being embedded within a hardware component, and the other steps being part of a software program.

The illustrations and examples provided herein are for explanatory purposes and are not intended to limit the scope of the appended claims. It will be recognized by those skilled in the art that changes or modifications may be made to the above described embodiment without departing from the broad inventive concepts of the subject disclosure. It is understood therefore that the subject disclosure is not limited to the particular embodiment which is described, but is intended to cover all modifications and changes within the scope and spirit of the subject disclosure.

What is claimed is:

1. A system, comprising:
   a systolic array, comprising a set of nodes coupled to each other via a communication network, each node comprising:
      at least one processor;
      a receive queue;
      a send queue;
      a receive queue configuration register; and
      a send queue configuration register;
   a first node of the systolic array comprising instructions, which, when executed by at least one processor of the first node, cause the first node to:
      generate a remote control message, wherein the remote control message comprises:
         an identifier of a second node of the systolic array, and
         a configuration for a receive queue of the second node or a send queue of the second node; and
      send the remote control message to the second node; and
   the second node of the systolic array, wherein the second node comprises instructions, which, when executed by a first processor of the second node, cause the second node to:
      receive the remote control message; and
      configure, based on the configuration in the remote control message, and without using a second processor of the second node, the receive queue of the second node or the send queue of the second node.

2. The system of claim 1, wherein the second node receives the remote control message at a hardware queue with dedicated buffering that is separate from the receive queue of the second node.

3. The system of claim 1, wherein the configuration in the remote control message causes the second node to issue messages to a third node.

4. The system of claim 3, wherein the remote control message includes an address of a receive queue of the third node.

5. The system of claim 4, wherein the first node instructions cause the second node to write the address to the send queue configuration register of the second node or the receive queue configuration register of the second node.

6. The system of claim 1, wherein the configuration in the remote control message causes the second node to issue messages to the first node.

7. The system of claim 1, wherein the remote control message includes a queue size, an entry size and a message header for the send queue of the second node.

8. The system of claim 1, wherein the first processor of the second node comprises a remote control message processor, distinct from the second processor of the second node, for parsing remote control messages and writing the send queue configuration register of the second node or the receive queue configuration register of the second node based on content of the remote control messages.

9. The system of claim 1, wherein the remote control message comprises a routing header identifying the second node.

10. The system of claim 1, wherein the communication network is a message bus.

11. A method, comprising:
   generating, by a first node of a systolic array, a remote control message, wherein the systolic array comprises a set of nodes, including the first node, coupled to each other via a communication network, wherein each node includes at least one processor, a receive queue, a send queue, a receive queue configuration register and a send queue configuration register, and wherein the remote control message comprises a descriptor that includes an identity of a second node of the systolic array and instructions to configure the receive queue of the second node or the send queue of the second node;
   sending, by the first node, the remote control message to the second node;
   receiving, by the second node, the remote control message; and
   configuring, by a first processor of the second node, based on the instructions in the remote control message, and without using a second processor of the second node, the receive queue of the second node or the send queue of the second node.

12. The method of claim 11, wherein receiving the remote control message comprises receiving the remote control message by a hardware queue with dedicated buffering that is separate from the receive queue of the second node.

13. The method of claim 11, wherein the instructions in the remote control message comprise instructions to configure the send queue of the second node to issue messages to a third node.

14. The method of claim 13, wherein the remote control message includes an address of a receive queue of the third node.

15. The method of claim 14, wherein configuring the send queue of the second node comprises writing the address of the receive queue of the third node to the send queue configuration register of the second node.

16. The method of claim 11, wherein the instructions in the remote control message comprise instructions to configure the send queue of the second node to issue messages to the first node.

17. The method of claim 11, wherein the remote control message includes a queue size, an entry size and a message header for the send queue of the second node.

18. The method of claim 11, wherein the first processor of the second node comprises a remote control message processor, distinct from the second processor of the second node, for parsing remote control messages received by the second node and writing the receive queue configuration register of the second node or the send queue configuration register of the second node with content of the remote control messages.

19. The method of claim 11, wherein the remote control message comprises a routing header identifying the second node.

20. The method of claim 11, wherein the communication network is a message bus.

* * * * *